UNITED STATES PATENT OFFICE.

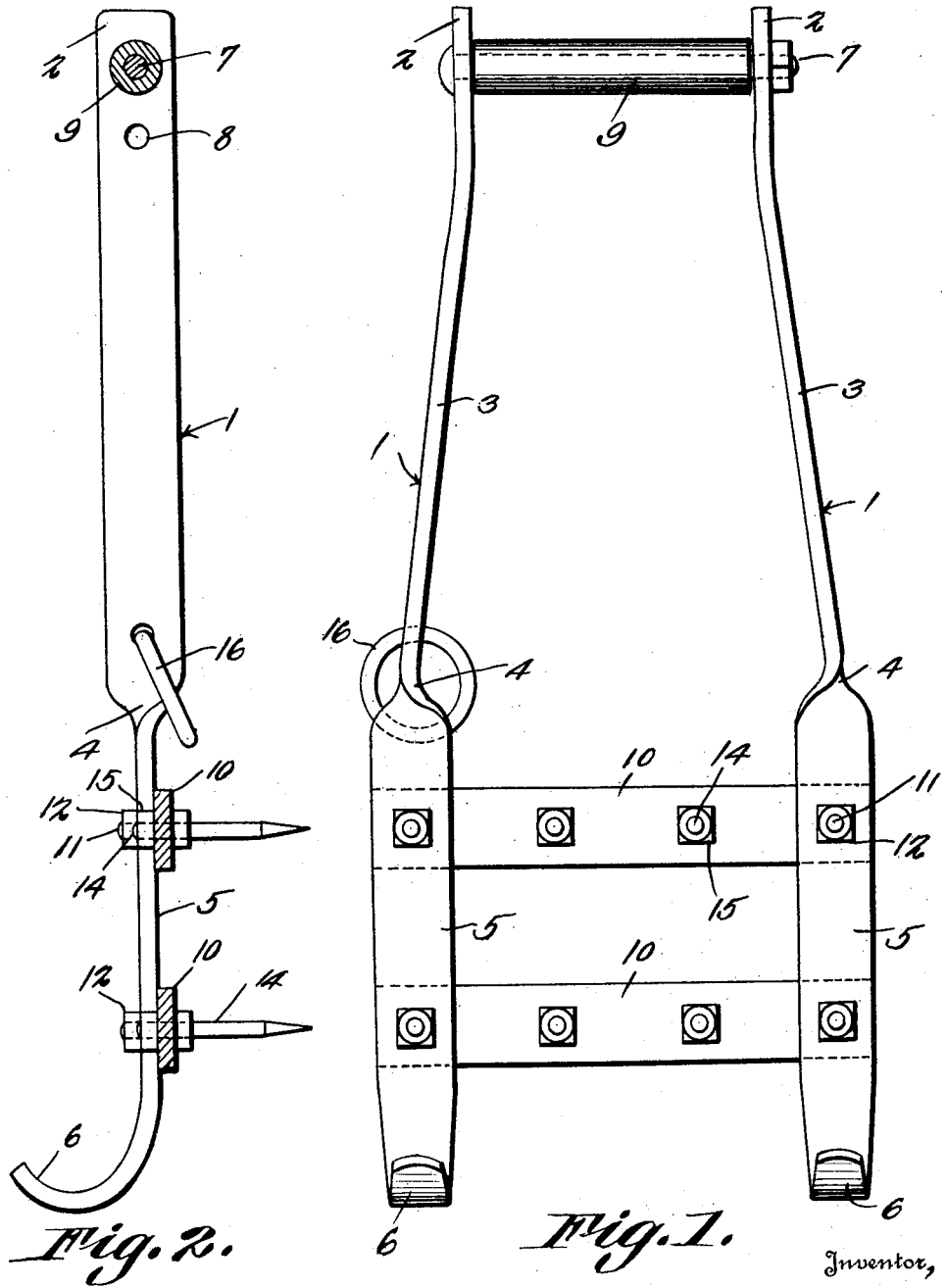

ANDREW J. FORSYTHE, OF RUSSIAVILLE, INDIANA.

YOKE.

1,399,204.  Specification of Letters Patent.  Patented Dec. 6, 1921.

Application filed April 11, 1921. Serial No. 460,171.

*To all whom it may concern:*

Be it known that I, ANDREW J. FORSYTHE, a citizen of the United States, residing at Russiaville, in the county of Howard and State of Indiana, have invented a new and useful Yoke, of which the following is a specification.

It is the object of this invention to provide a strong and simple yoke which will prevent cattle from butting into and tearing down wire fences.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a device constructed in accordance with the invention; Fig. 2 is a longitudinal section of the structure shown in Fig. 1.

The yoke forming the subject matter of this application embodies a frame made up of a pair of side bars denoted generally by the numeral 1. The upper ends 2 of the side bars 1 are parallel, and merge into diverging portions 3 which are twisted as shown at 4, to form parallel parts 5 terminating in forwardly presented hooks 6.

The upper ends 2 of the side bars 1 are connected by a securing element 7, there being extra holes 8 in the ends 2, to provide for an adjustment of the securing element. On the securing element 7 a tubular roller 9 is journaled. The ends of cross bars 10 are overlapped on the parts 5 of the side bars 1. Pointed prongs 11 extend through the ends of the cross bars 10 and through the parts 5. Nuts 12 are threaded on the prongs 11, one nut on each prong engaging the part 5, and the other nut on each prong engaging the cross bar 10. Other prongs 14 are mounted in the cross bars 10, between the parts 5 of the side bars 1 and are held in place by nuts 15 engaging the forward and rear surfaces of the cross bars 10. A ring 16 is mounted loosely in one of the diverging portions 3, relatively near to one of the twists 4.

In practical operation the securing element 7 may be removed, and the yoke may be placed about the neck of cow, the securing element 7 being replaced, with the roller 9 mounted thereon. The roller 9 engages the neck of the animal, and permits the yoke to adjust itself on the neck. The ring 16 is adapted to receive a rope or halter. When the animal butts into a fence, or attempts to engage her horns therewith, the frame swings backwardly, and the prongs 14 and 11 prick the chest of the animal and cause her to desist. The hooks 6 are adapted to slide along the ground, and they prevent the lower ends of the side bars from catching in the earth while the animal is moving about from place to place and feeding.

Owing to the fact that the side bars 1 are twisted as shown at 4, the flat surfaces of the bars are so presented that the cross bars 10 may be attached readily thereto.

Having thus described the invention, what is claimed is:—

1. In a device of the class described, a frame made up of side bars having hook-shaped runners at their lower ends; a cross bar connecting the side bars, adjacent to the runners; prongs on the side bars and forming connections between the side bars and the cross bar; and a roller journaled between the upper ends of the side bars.

2. In a device of the class described, a frame made up of a pair of side bars, the upper ends of the side bars being parallel, and merging into diverging portions which are twisted to form parallel parts; a securing element mounted in the upper ends of the side bars; a roller journaled on the securing element and disposed between the upper ends of the side bars; a cross bar connecting said parallel parts of the side bars; and a prong carried by the frame and projecting rearwardly with respect to the cross bar and to said parallel parts.

3. In a device of the class described, a frame made up of side bars; a roller journaled between the upper ends of the side bars; a cross bar extended between the lower portions of the side bars; prongs connecting the ends of the cross bar with the side bars; a prong carried by the cross bar, between the side bars; and a ring mounted in one side bar, above the cross bar.

In testimony that I claim the foregoing as my own, I have hereto affixed my signature in the presence of two witnesses.

ANDREW J. FORSYTHE.

Witnesses:
J. A. TARKINGTON,
VALENTINE ARNETT.